(12) United States Patent
Magnanimo et al.

(10) Patent No.: US 12,547,172 B2
(45) Date of Patent: Feb. 10, 2026

(54) INCREMENTAL BOOTING OF FUNCTIONS FOR AUTONOMOUS AND SEMI-AUTONOMOUS SYSTEMS AND APPLICATIONS

(71) Applicant: NVIDIA Corporation, Santa Clara, CA (US)

(72) Inventors: Vito Magnanimo, Munich (DE); Elliot Simon, San Diego, CA (US)

(73) Assignee: NVIDIA Corporation, Santa Clara, CA (US)

( * ) Notice: Subject to any disclaimer, the term of this patent is extended or adjusted under 35 U.S.C. 154(b) by 166 days.

(21) Appl. No.: 18/446,653

(22) Filed: Aug. 9, 2023

(65) Prior Publication Data
US 2025/0053170 A1 Feb. 13, 2025

(51) Int. Cl.
G05D 1/00 (2024.01)

(52) U.S. Cl.
CPC .......... *G05D 1/0088* (2013.01); *G05D 1/0055* (2013.01)

(58) Field of Classification Search
CPC ..................... G05D 1/0088; G05D 1/0055
See application file for complete search history.

(56) References Cited

U.S. PATENT DOCUMENTS

| | | | | |
|---|---|---|---|---|
| 10,782,685 | B1 * | 9/2020 | Sucan | G05D 1/0077 |
| 12,269,491 | B2 * | 4/2025 | Lenke | G05D 1/0088 |
| 2015/0033054 | A1 * | 1/2015 | Armbruster | B60W 50/0098 713/323 |
| 2017/0302521 | A1 * | 10/2017 | Lui | H04L 41/20 |
| 2018/0225769 | A1 * | 8/2018 | Slusar | G06Q 50/40 |
| 2018/0292897 | A1 * | 10/2018 | Wald | G06F 3/011 |
| 2019/0251265 | A1 * | 8/2019 | Ploucha | G06F 21/577 |
| 2020/0051318 | A1 * | 2/2020 | Muthler | G06N 5/046 |
| 2020/0209875 | A1 * | 7/2020 | Marzani | G06V 20/58 |
| 2020/0326967 | A1 * | 10/2020 | Hayes | G06F 9/45558 |
| 2021/0188294 | A1 * | 6/2021 | Kain | B60W 50/023 |
| 2021/0237750 | A1 * | 8/2021 | Müller | B60W 50/038 |
| 2021/0302958 | A1 * | 9/2021 | Tschanz | G05D 1/0061 |
| 2021/0304591 | A1 * | 9/2021 | Small | G01C 21/34 |
| 2022/0050461 | A1 * | 2/2022 | Karachalios | G05D 1/0088 |
| 2022/0126872 | A1 * | 4/2022 | Han | B60W 60/0018 |
| 2022/0371607 | A1 * | 11/2022 | Uhlig | B60W 50/029 |
| 2023/0124848 | A1 * | 4/2023 | Nister | G05D 1/248 701/23 |

(Continued)

*Primary Examiner* — Abdalla A Khaled
(74) *Attorney, Agent, or Firm* — Iron Summit IP LLP

(57) ABSTRACT

In various examples, incremental booting of functions for autonomous systems and applications is described herein. Systems and methods are disclosed that boot functions of a machine using different phases in order to more quickly provide at least a portion of the functions without compromising the safety of the machine. For example, during a first phase, resources associated with the machine may be allocated while the functions are initialized. Additionally, at least a first portion of the functions, such as functions that do not compromise the safety of the machine if errors occur, may be made available for use by one or more users of the machine. Next, during a second phase, at least a second portion of the functions, such as functions that may compromise the safety of the machine if errors occur, may be made available for use by the user(s) of the machine.

20 Claims, 13 Drawing Sheets

(56) References Cited

U.S. PATENT DOCUMENTS

| | | | |
|---|---|---|---|
| 2023/0159041 A1* | 5/2023 | Han | B60W 50/0205 701/23 |
| 2023/0192139 A1* | 6/2023 | Kumavat | B60W 50/0098 701/25 |
| 2023/0322273 A1* | 10/2023 | Liu | B60W 50/12 701/23 |
| 2025/0086036 A1* | 3/2025 | Abdelhameed | B60W 50/0205 |

* cited by examiner

INCREMENTAL BOOTING OF FUNCTIONS FOR AUTONOMOUS AND SEMI-AUTONOMOUS SYSTEMS AND APPLICATIONS

BACKGROUND

Designing a system to drive a vehicle semi-autonomously or autonomously without supervision at a level of safety required for practical acceptance is tremendously difficult and requires may different types of functions with varying levels of safety. For instance, an autonomous vehicle may include functions that are vital to the safety of the autonomous vehicle such that if associated errors occur (e.g., safety critical functions), the safety of the machine may be compromised—such as fully autonomous driving functions and minimum risk maneuver functions. As another example, some functions of an autonomous vehicle (e.g., non-safety related functions) may not relate to or may not compromise the safety of the vehicle—such as entertainment functions (e.g., a radio, a display, etc.), parking assistance functions, and lane assistance functions. As such, in order to maintain a high level of safety, the autonomous vehicle may operate in various phases when booting functions. For example, during a first operating phase, such as an initialization phase, the autonomous vehicle may at least allocate resources (e.g., processing resources, memory resources, network resources, etc.) and initialize only the safety-related functions while making non-safety related functions unavailable. Next, during a second operating phase, such as an operational phase that occurs when the allocation of resources is complete (e.g., the entire system is ready), the autonomous vehicle may make all of the functions available for use by a user of the autonomous vehicle. Finally, during a third operating phase, such as a deinitialization phase that occurs when the autonomous vehicle is done navigating, the autonomous vehicle may terminate (e.g., shutdown) the functions and/or the resources.

As described herein, the autonomous vehicle may operate in the three operating phases for safety reasons. For example, the autonomous vehicle may wait until the second operating phase to make all of the functions available to the user since interference may occur with one or more functions while the resources are still being allocated. As such, if interference occurs with a function that is safety critical, then there may be a risk of safety for the autonomous vehicle. Alternatively, if interference occurs with a function that is not safety critical (e.g., a failsafe function), then there will not be a risk of safety to the autonomous vehicle. However, even though there is no risk of safety if errors occur to such functions, the user of the autonomous vehicle may still need to wait until the second operating phase for the function to be available for use.

SUMMARY

Embodiments of the present disclosure relate to incremental booting of functions for autonomous and semi-autonomous systems and applications. Systems and methods are disclosed that boot functions of a vehicle (and/or other type of machine) using different operating phases in order to more quickly provide at least a portion of the functions without compromising the safety of the vehicle. For example, during a first operating phase (e.g., an initialization phase), resources associated with the vehicle may be allocated while the functions are initialized. Additionally, at least a first portion of the functions, such as functions that are associated with one or more levels of safety, may be made available for use by one or more users of the vehicle. Next, during a second operating phase (e.g., an operational phase), at least a second portion of the functions, such as functions that are associated with one or more additional, higher levels of safety, may be made available for use by the user(s) of the vehicle. In some circumstances, the second operating phase is initialized based at least on the entire system being ready (e.g., the resource allocation being complete). Next, and during a third operating phase (e.g., a deinitialization phase), the functions and/or the resources may be terminated (e.g., shutdown).

In contrast to conventional systems, such as those described above, the current systems, in some embodiments, are able to more quickly provide certain functions to the user(s), such as the first portion of the functions that are associated with the one or more levels of safety, while still maintaining the same level of safety for the vehicle. In some examples, the current systems are able to more quickly provide such functions based on causing the functions to be available to the user(s) even when the resources are still being allocated and/or the other functions are still being initialized. Additionally, the current systems are able to maintain the same level of safety for the vehicle by refraining from making the second portion of the functions available until the entire system is ready (e.g., the resource allocation is complete). This way, interference will not occur with the second portion of the functions, such as interference that is due to the allocation of the resources.

BRIEF DESCRIPTION OF THE DRAWINGS

The present systems and methods for incremental booting of functions for autonomous or semi-autonomous systems and applications are described in detail below with reference to the attached drawing figures, wherein.

DETAILED DESCRIPTION

Figure 1:
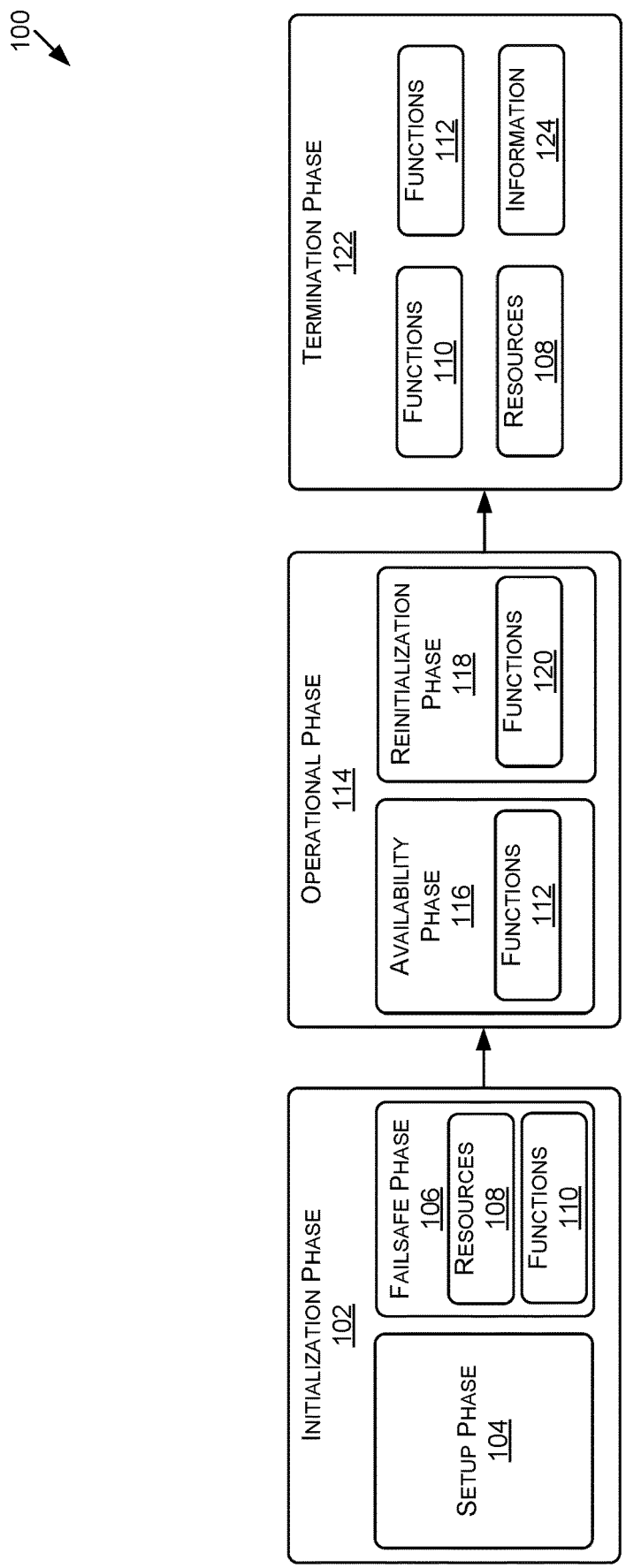
FIG. 1 illustrates an example data flow diagram for a process of booting functions using various operating phases, in accordance with some embodiments of the present disclosure.

Systems and methods are disclosed related to incremental booting of functions for semi-autonomous and autonomous systems and applications. Although the present disclosure may be described with respect to an example autonomous or semi-autonomous vehicle 800 (alternatively referred to herein as "vehicle 800," "ego-vehicle 800," "machine 800," or "ego-machine 800," an example of which is described with respect to FIGS. 8A-8D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to path planning, this is not intended to be limiting, and the systems and methods described herein may be used in augmented reality, virtual reality, mixed reality, robotics, security and surveillance, autonomous or semi-autonomous machine applications, and/or any other technology spaces where path planning may be used.

For instance, a system(s) may incrementally boot various functions of a vehicle or other machine type using one or more operating phases in order to more quickly provide a first portion of the functions to one or more users without compromising the safety of the vehicle or machine. As described herein, a function associated with a vehicle may include (1) a function that is associated with a first level of safety such that a failure and/or error will not affect safety, which may be referred to as a "non-safety related function" (e.g., since it may be available, in some examples, during a "failsafe phase"), (2) a function that is associated with a second level of safety such that a failure and/or error may lead to a temporary decrease in safety that may be fixed by stopping the function and/or verifying that one or more conditions are met, which may be referred to as the "failsafe function" (e.g., since it may be available, in some examples, during an "failsafe phase"), and/or (3) a function that is associated with a third level of safety such that a failure and/or error is not tolerated (e.g., with a certain degree) as the function must guarantee reliability, which may also be referred to as an "availability function" (e.g., since it is made available, in some examples, during a "available phase"). Although three levels of safety are described, this is not intended to be limiting, and any number of safety levels may be included in the system.

For example, an availability function may include, but is not limited to, a fully autonomous driving function (e.g., fully autonomous mode), a minimum risk maneuver function (e.g., safely stopping if problems occur with the vehicle), and/or the like. Additionally, a failsafe function may include, but is not limited to, an assisted parking function, an assisted driving function, a function to summon the vehicle, and/or the like. In some examples, the function may be considered failsafe since the vehicle is able to provide control to the user (e.g., the driver) if an error occurs with the function. Still, a non-safety related function may include, but is not limited to, an entertainment function (e.g., a radio, a display, etc.), an environmental control functions, and/or the like. As such, in some examples, the higher the level of safety, the more important it may be for the system(s) to ensure that failure associated with the function does not occur. For example, while failure associated with a non-safety related function may cause some problems, such as annoyance to a user, such a failure may be more tolerated than a failure associated with an availability function, which may need to be reliable for the vehicle to navigate.

In some examples, the system(s) may initially operate in a first operating phase (which may be split into additional operating phases, as described in more detail below), which may also be referred to as an "initialization phase," in which the hardware, the software, the operating system, and/or the like is started or booted up. Additionally, during the first operating phase, the system(s) may allocate resources (e.g., processing resources, memory resources, network resources, etc.) associated with the system(s), such as to the functions, while also beginning the initialization of the functions using the allocated resources. In order to more quickly provide the first portion of the functions to the user(s), the system(s) may also cause the first portion of the function to be available for use based at least on completion of the initialization of the first portion of the functions. As described herein, in some examples, the first portion of the functions may include the non-safety related functions and/or the failsafe functions. Additionally, in order to maintain the safety of the vehicle, the system(s) may refrain from making a second portion of the functions available during the first operating phase, even at a completion of the initialization of the second portion of the functions. As described herein, the second portion of the functions may include the availability functions.

Next, the system(s) may operate in a second operating phase, which may be referred to as an "operational phase," at the occurrence of one or more first events. As described, the first event(s) may include, but is not limited to, the allocation of the resources being complete, the entire system(s) being ready, safety checks indicating that there are no errors with the system(s) and/or the functions, and/or so forth. During the second operating phase, the system(s) may then cause the second portion of the functions to be available for use. As described herein, by waiting to cause the second portion of the functions to be available during the second operating phase, problems that may occur during the initialization of the system(s), such as interference that may occur based on the allocation of the resources, may not interfere with the second portion of the functions.

Next, the system(s) may operate in a third operating phase, which may be referred to as a "deinitialization phase," such as at the occurrence of one or more second events. As described herein, the second event(s) may include, but is not limited to, the vehicle being parked, the vehicle being turned off, the user(s) being finished using the vehicle, and/or the like. During the third operating phase, the system(s) may at least terminate (e.g., shutdown) the functions and/or resources associated with the vehicle.

In some examples, the system(s) may perform one or more safety processes if an error does occur with a function. For a first example, if a function fails, such as a non-safety related function and/or a failsafe function, the system(s) may operate in a fourth operating phase, which may also be referred to as a "reinitialization phase," wherein the system(s) causes the second portion of the functions to be unavailable for use. The system(s) may then cause the failed function to again be initialized and available for use. Additionally, once the function is again available for use, the system(s) may switch back to the second operating phase and/or cause the second portion of the functions to again be available for use. For a second example, and again if a function fails, such as a failsafe function, the system(s) may switch back to the first operating phase in order again initialize the function and/or one or more additional functions. Once the function and/or the additional function(s) are available for use, the system(s) may then again switch back to the second operating phase.

Additionally, or alternatively, in some examples, the system(s) may perform one or more safety processes based on when an error occurs with a function. For a first example, if a function fails during a failsafe phase, which is described in more detail herein, the vehicle may be stopped and/or the function that failed may be contained by terminating the failed function. For a second example, if a function fails during an available phase, which is described in more detail herein, the resources associated with the vehicle may be blocked (which may cause delays), the vehicle may be stopped, and/or the one or more functions may be terminated.

In some examples, in order to allow for booting the functions using the various operating phases describes herein, a developer, vendor, and/or the like associated with the vehicle may provide additional information associated with the functions. For example, the information may indicate whether a function is at least a non-safety related or non-critical function, a failsafe function, or an availability or critical function. This way, the system(s) is able to determine which functions the system(s) may make available for use during the first operating phase and which functions the system(s) may not make available for use until the second operating phase. For example, if the system(s) determines that a first initialization of a first function and a second initialization of a second function are both complete during the first operating phase, and that the first function includes a failsafe function while the second function includes an availability function, then the system(s) may make the first function available for use during the first operating phase. However, the system(s) may also determine to wait until the second operating phase to make the second function available for use in order to ensure that no errors occur, such as interference, with the second function.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, generative AI, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems implementing large language models (LLMs), systems for performing conversational AI operations, systems for performing light transport simulation, systems for performing collaborative content creation for 3D assets, systems implementing one or more language models—such as large language models (LLMs), systems implemented at least partially using cloud computing resources, and/or other types of systems.

With reference to FIG. 1, FIG. 1 illustrates an example data flow diagram for a process 100 of booting functions using various operating phases, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous or semi-autonomous vehicle 800 of FIGS. 8A-8D, example computing device 900 of FIG. 9, and/or example data center 1000 of FIG. 10.

The process 100 may include a system(s) (e.g., the vehicle 800, the computing device 900, the data center 1000, etc.) operating in an initialization phase 102. As shown by the example of FIG. 1, in order provide the improvements described herein, such as more quickly providing a portion of functions to a user while also maintaining safety of the vehicle, the initialization phase 102 may be broken into two additional operating phases, such as a setup phase 104 and a failsafe phase 106. During the setup phase 104, the system(s) may start the hardware, the software, the operating system, and/or the like, which is illustrated at least in FIG. 3. Additionally, during the setup phase 104, the system(s) may start an infrastructure, such as one or more monitors, that ensure any errors associated with the system(s) will be detected. For example, the system(s) may perform one or more hardware checks, one or more software checks, and/or the like to detect any errors. If an error is detected, then the system(s) may move to operating in a safe-state until the error is no longer detected. However, if an error is not detected, then the system(s) may move to the failsafe phase 106.

In the failsafe phase 106, the system(s) may begin to allocate resources 108, such as processing resources, memory resources, network resources, and/or any other types of resources, to at least the functions. Additionally, as the resources 108 are allocated to the functions, the system(s) may also begin to initialize the functions. For example, the system(s) may allocate a first portion of the resources 108 to a first function and, based at least on the first portion of the resources 108 being allocated, cause a first initialization associated with the first function to occur. The system(s) may also allocate a second portion of the resources 108 to a second function and, based at least on the second portion of the resources 108 being allocated, cause a second initialization associated with the second function to occur. The system(s) may then continue to perform these processes for one or more additional functions (e.g., each additional function) during the failsafe phase 106.

As described herein, in order to more quickly provide the user with at least a first portion of functions 110, such as one or more failsafe functions for which safety of the vehicle is not compromised if errors occur, the system(s) may also cause the first portion of the functions 110 to be available for use to the user during the failsafe phase 106. For example, and using the example above where the system(s) initializes the two functions, if the first function includes a non-safety related function and/or a failsafe function, the system(s) may make the first function available for use by the user during the failsafe phase 106. As described herein, the system(s) may make a function available by starting the function and/or providing functionality associated with the function to the user. For a first example, if a function includes an entertainment function (e.g., a non-safety related function), such as the radio, then the user may be able to listen to the radio based on the system(s) making the function available. For a second example, if a function includes an assisted parking function (e.g., a failsafe function), then the user may be able to use assisted parking based on the system(s) making the function available. Still, for a third example, if a function includes a fully autonomous function (e.g., an availability function), then the user may place the vehicle in a fully autonomous mode based on the system(s) making the function available.

However, in order to maintain the safety of the vehicle, the system(s) may refrain from making a second portion of functions 112, such as one or more availability functions, available during the failsafe phase 106. For example, and using the example above where the system(s) initializes the two functions, if the second function includes an availability function, even if the initialization of the second function is complete during the failsafe phase 106, the system(s) may refrain from making the second function available for use to the user. In some examples, the system(s) refrains from making the second function available since interference may still occur with the second function during the failsafe phase 106 based on the resources still being allocated by the system(s).

Figure 2:
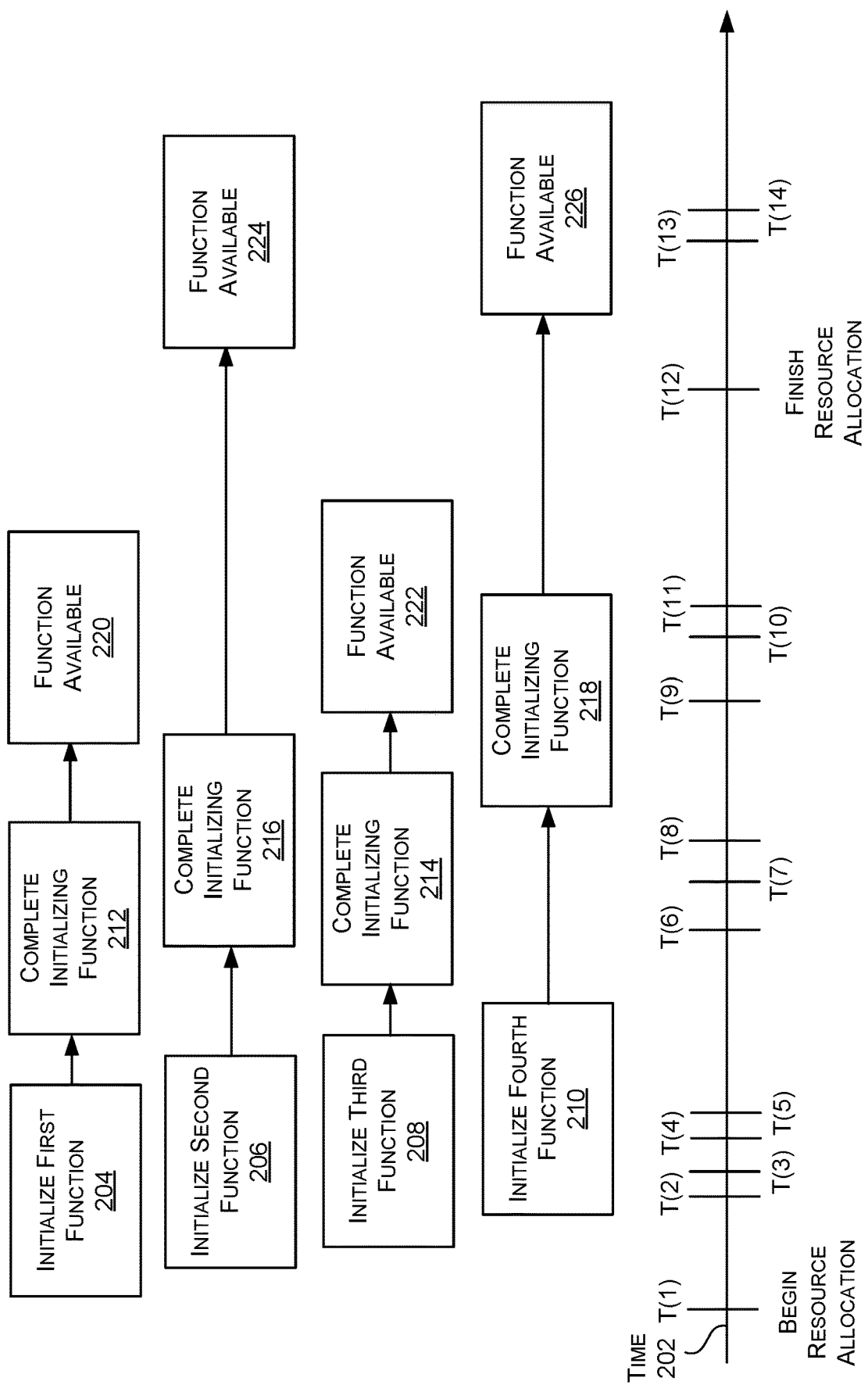
FIG. 2 illustrates an example of initializing and providing functions associated with a vehicle over a period of time, in accordance with some embodiments of the present disclosure.

For instance, FIG. 2 illustrates an example of initializing and providing functions associated with a vehicle over a period of time 202, in accordance with some embodiments of the present disclosure. As shown by the example of FIG. 2, at a first time T(1) that may occur during the failsafe phase 106, the system(s) may begin to allocate resources to functions. The system(s) may then begin initialization of a first function 204 at a second time T(2), such as when first resources associated with the first function have been allocated, begin initialization of a second function 206 at a third time T(3), such as when second resources associated with the second function have been allocated, begin initialization of a third function 208 at a fourth time T(4), such as when third resources associated with the third function have been allocated, and begin initialization of a fourth function 210 at a fifth time T(5), such as when fourth resources associated with the fourth function have been allocated. In some examples, the system(s) may perform one or more additional processes for one or more additional functions.

As further illustrated in the example of FIG. 2, the initialization of the first function may be complete 212 at a sixth time T(6), the initialization of the third function may be complete 214 at a seventh time T(7), the initialization of the second function may be complete 216 at an eighth time T(8), and the initialization of the fourth function may be complete 218 at a ninth time T(9). As such, the system(s) may determine that the first function includes a non-safety related function and, based at least on the determination, the system(s) may make the first function available for use 220 by the user at a tenth time T(10). The system(s) may also determine that the third function includes a failsafe function and, based at least on the determination, the system(s) may make the third function available for use 222 by the user at an eleventh time T(11). However, the system(s) may determine that the second function and the fourth function include availability functions. As such, the system(s) may refrain from making the second function and the fourth function available while the resources are still being allocated.

Referring back to the example of FIG. 1, the process 100 may include the system(s) switching to operating in an operational phase 114. As described herein, the system(s) may switch to operating in the operational phase 114 based on the occurrence of one or more first events. The first event(s) may include, but is not limited to, the allocation of the resources 108 being complete, the entire system(s) being ready, safety checks indicating that there are no errors with the system(s) and/or the functions, and/or so forth. As shown by the example of FIG. 1, in order provide the improvements described herein, such as more quickly providing the first portion of functions 110 to the user while also maintaining safety of the vehicle, the operational phase 114 may include at least an availability phase 116 in which the system(s) now causes the second portion of functions 112 to be available for use by the user.

For instance, and referring back to the example of FIG. 2, the system(s) may at least finish allocating the resources at a twelfth time T(12). As such, based at least on the occurrence of that event, the system(s) may switch from operating in the failsafe phase 106 to operating in the availability phase 116. The system(s) may then make the second function available for use 224 by the user at a thirteenth time T(13) and make the fourth function available for use 226 by the user at a fourteenth time T(14). As such, by performing the processes illustrated in the example of FIG. 2, the system(s) is able to make the first function and the third function, which again respectively include a non-safety related function and a failsafe function, available for use by the user before the completion of the allocation of the resources. This way, and compared to conventional vehicle systems, the system(s) is able to more quickly provide these functions to the user. Additionally, by waiting to make the second function and the fourth function, which again include availability functions, available for use until after the completion of the allocation of the resources, the system(s) is still able to provide the same level of safety as the conventional vehicle systems.

Referring back to the example of FIG. 1, in some examples, the operational phase 114 may include a reinitialization phase 118 that the system(s) uses if one or more errors still occur with one or more of the functions 120. For instance, if an error occurs with a function 120, such as a non-safety related function and/or a failsafe function or an availability function, the system(s) may initially terminate (e.g., shutdown) the function 120, which is described in more detail with respect to the example of FIG. 3. The system(s) may then determine whether to reboot the function 120 and/or whether to perform one or more additional operations based at least on the function 120 being terminated. For a first example, if the function 120 includes a non-safety related function and/or a failsafe function that the system(s) may safely reboot, then the system(s) may perform one or more operations to safely reboot the function. For a second example, if the function 120 includes an availability function, then the system(s) may begin activating and/or executing one or more backup functions (e.g., a function 110 and/or a function 112) in order to maintain the level of safety for the vehicle. Additionally, in either of the examples, depending on the type of function, the system(s) may provide control back to the user. For example, if the function 120 includes a parking assistance function, the system(s) may notify the user that there is an error with the function 120 such that the user is able to take control of the vehicle for parking.

As such, in some examples, if a function 120 fails, the system(s) may switch from operating in the operational phase 114 and/or the availability phase 116 to operating in the reinitialization phase 118. While operating the reinitialization phase 118, the system(s) may cause one or more functions to temporarily be unavailable to the user (e.g., pause the function(s)), such as the second portion of the functions 112, in order to prevent errors from occurring with the function(s). The system(s) may then allocate resources to the failed function 120 and/or cause the failed function 120 to reinitialize. Additionally, once the reinitialization of the failed function 120 is complete, the system(s) may again cause the function 120 to be available for use by the user. After the function 120 is again available for use by the user, the system(s) may then switch from operating in the reinitialization phase 118 to operating in the operational phase 114 and/or the availability phase 116. The system(s) may then cause the function(s), which was temporarily paused, to again be available for use by the user. By performing such processes using the reinitialization phase 118, the system(s) may be able to again cause the failed function 120 to be available to the user while also maintaining the level of safety for the vehicle.

Additionally, or alternatively, in some examples, the system(s) may switch from operating in the operational phase 114 and/or the availability phase 116 to operating in the initialization phase 102 (e.g., the failsafe phase 106). While operating the initialization phase 102, the system(s) may again cause one or more functions to temporarily be unavailable to the user (e.g., pause the function(s)), such as the second portion of the functions 112, in order to prevent errors from occurring with the function(s). The system(s) may then allocate resources to the failed function 120 and/or cause the failed function 120 to reinitialize. Additionally, once the reinitialization of the failed function 120 is complete, the system(s) may again cause the function 120 to be available for use by the user. After the function 120 is again available for use by the user, the system(s) may then switch from operating in the initialization phase 102 to operating in the operational phase 114 and/or the availability phase 116. The system(s) may then cause the function(s), which was temporarily paused, to again be available for use by the user. Again, by performing such processes using the initialization phase 102, the system(s) may be able to again cause the failed function 120 to be available to the user while also maintaining a level of safety for the vehicle.

As described herein, in some examples, if a function 120 fails, the system(s) may cause one or more backup functions to activate and/or execute in order to maintain the level of safety for the vehicle. For a first example, if a function 120 includes a failsafe function such as an assisted parking function that causes the vehicle to automatically park, the system(s) may cause the vehicle to stop and/or the function 120 to terminate. The system(s) may then perform one or more additional processes, such as notifying the user about the failure and/or providing the user with control to park the vehicle. For a second example, if a function 120 includes an availability function such as a minimum risk maneuver function that causes the vehicle to safely stop in specific circumstances, such as when a potential collision with another vehicle is detected, one or more additional functions may be executed based on the function failing. For instance, the system(s) may cause one or more additional functions associated with safely navigating the vehicle to occur, such as navigating along a different route until the user of the vehicle is able to take control of the vehicle. This way, the system(s) is again able to maintain a level of safety for the vehicle and/or the user.

In some examples, the system(s) may still perform one or more additional operations based on a failure of a function 120. For example, if another function (e.g., a function 110, a function 116, etc.) depends on the failed function 120, then the system(s) may terminate the other function in order to maintain the level of safety. For example, if the failed function 120 includes a perception function that is associated with detecting the locations of objects within the environment, then the system(s) may terminate one or more other functions that depend on the locations of objects to operate. For instance, the system(s) may terminate a parking assistance function since the parking assistance function may not operate as intended without initially determining the locations of objects within the environment.

In some examples, the system(s) may perform additional processes based on when a failure occurs with a function. For a first example, if a function 110 fails during the failsafe phase 106, the system(s) may cause the vehicle to stop and/or perform one or more other safety procedures. Additionally, the system(s) may notify the user about the failure and/or provide the user with control of the vehicle. For a second example, if a function 110 and/or a function 112 fails during the availability phase 116 then the system(s) may terminate the function 110 or 112 and/or one or more additional functions 110 or 112, stop the vehicle, and/or perform one or more additional safety procedures.

As further illustrated in the example of FIG. 1, the process 100 may include the system(s) switching to operating in a deinitialization phase 122. As described herein, the system(s) may switch to operating in the deinitialization phase 122 based on the occurrence of one or more second events. The second event(s) may include, but is not limited to, the vehicle being parked, the vehicle being turned off, the user(s) being finished using the vehicle, and/or the like. In some examples, while operating in the deinitialization phase 122, the system(s) may begin to terminate (e.g., shutdown) the functions, such as the first portion of the functions 110 and/or the second portion of the functions 112. Additionally, in some examples, while operating in the deinitialization phase 122, the system(s) may begin shutting down the resources 108 and/or saving information 124 that the system(s) may later use, such as location information indicating a current location of the vehicle, preference information indicating one or more preferences associated with the user, and/or any other information.

Figure 3:
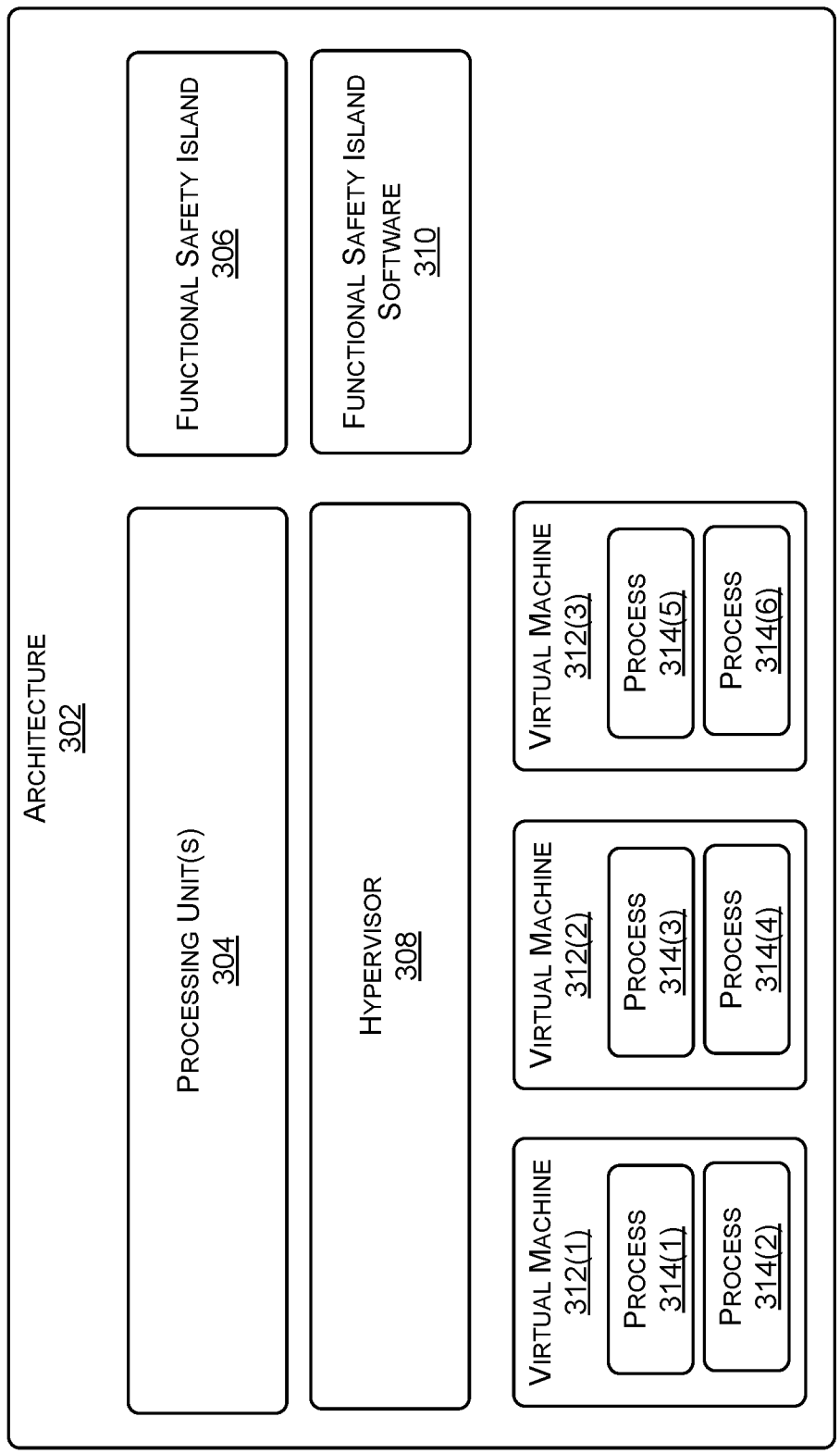
FIG. 3 illustrates an example architecture of a system(s) that performs one or more of the processes described herein, in accordance with some embodiments of the present disclosure.

FIG. 3 illustrates an example architecture 302 of the system(s) that performs one or more of the processes described herein, in accordance with some embodiments of the present disclosure. As shown, the architecture 302 may include hardware, such as one or more processing units 304 (e.g., one or more central processing units, one or more graphics processing units, one or more deep learning accelerators (DLAs), one or more programmable vision accelerators (PVAs)—which may include one or more vector processing units and/or direct memory access units (DMAs), one or more data processing unit (DPUs), etc.) and a functional safety island 306. In some examples, the functional safety island 306 may include a set of one or more small or discrete processing units. For example, the functional safety island may be implemented such that common cause failures—e.g., between the function safety island 306 and the processing unit(s) 304—are avoided. In some examples, the architecture may include additional hardware components, such as one or more of the hardware components illustrated in the example of FIG. 8C. The architecture 302 may further include software, such as a hypervisor 308, functional safety island software 310 that is executed by the functional safety island 306, and virtual machines 312(1)-(3) (also referred to singularly as "virtual machine 312" or in plural as "virtual machines 312") that execute processes 314(1)-(6) (also referred to singularly as "process 314" or in plural as "processes 314") associated with functions. While the example of FIG. 3 illustrates the architecture 302 as including three virtual machines 312, in other examples, the architecture 302 may include any other number of virtual machines.

In some examples, the hypervisor 308 virtualizes the access to the different resources (e.g., the resources 108) and/or accelerators. Additionally, the hypervisor 308 provides an abstraction for the hardware resources and a set of the virtual machines 312 to run the different functions (e.g., the functions 110, the functions 116, etc.). In some examples, functional decisions are taken by the software that is executing on the processing unit(s) 304. For instance, in case of an error (e.g., a problem with a function), the error is usually reported to the functional safety island 306. The functional safety island 306 may then perform processing to determine how to proceed based at least on the error.

For example, the hardware (e.g., the processing unit(s) 304, the functional safety island 306, etc.) may take a local action by terminating the virtual machine 312 associated with a function for which there is an error and/or injecting a failure into the virtual machine 312. In some examples, the virtual machine 312 may then take a local action, such as terminating one or more processes 314 associated with the function. Additionally, the hypervisor 308 and/or the virtual machine 312 may information the functional safety island software 310 of the action taken, such as terminating the virtual machine 312 and/or the process(es) 314. The functional safety island software 310 may then make a decision on how to proceed, such as by using one or more of the processes described herein. For example, the functional safety island software 310 may determine whether to stop the function, stop all functions, continue running, restart the function, and/or perform any other process.

Now referring to FIGS. 4-7, each block of methods 400, 500, 600, and 700, described herein, comprises a computing process that may be performed using any combination of hardware, firmware, and/or software. For instance, various functions may be carried out by a processor executing instructions stored in memory. The methods 400, 500, 600, and 700 may also be embodied as computer-usable instructions stored on computer storage media. The methods 400, 500, 600, and 700 may be provided by a standalone application, a service or hosted service (standalone or in combination with another hosted service), or a plug-in to another product, to name a few. In addition, the methods 400, 500, 600, and 700 are described, by way of example, with respect to FIG. 1. However, these methods 400, 500, 600, and 700 may additionally or alternatively be executed by any one system, or any combination of systems, including, but not limited to, those described herein.

Figure 4:
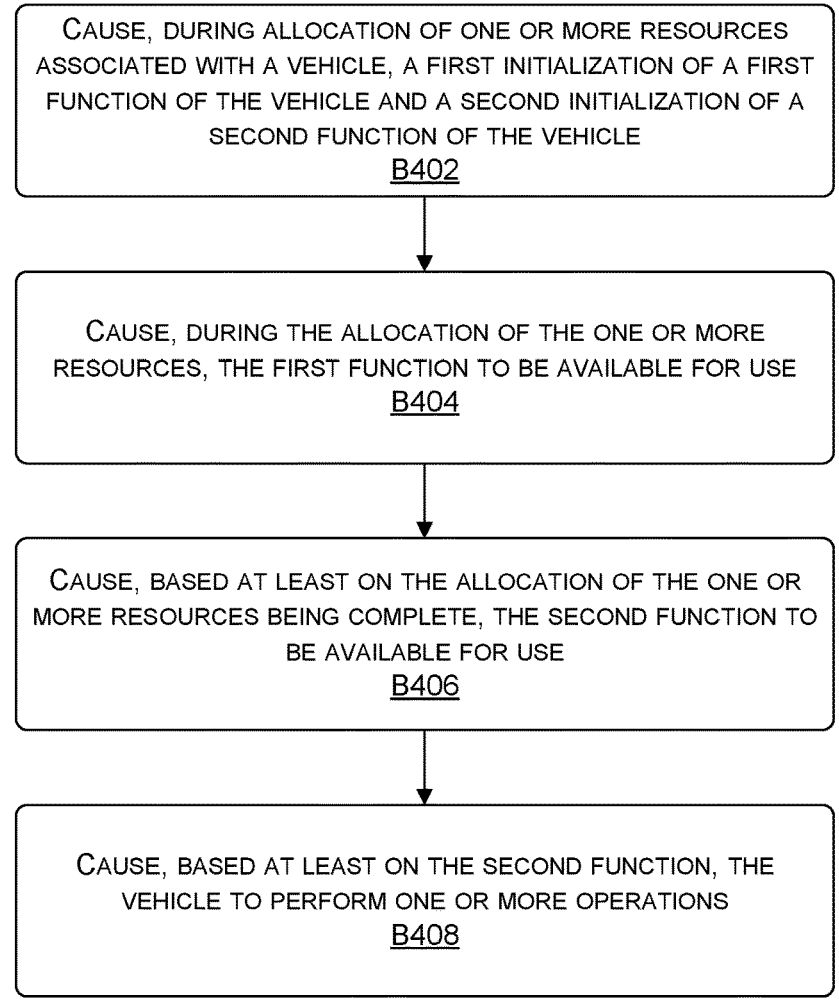
FIG. 4 illustrates a flow diagram showing a method for incrementally booting functions associated with a vehicle, in accordance with some embodiments of the present disclosure.

FIG. 4 illustrates a flow diagram showing a method 400 for incrementally booting functions associated with a vehicle, in accordance with some embodiments of the present disclosure. The method 400, at block B402, may include causing, during allocation of one or more resources associated with a vehicle, a first initialization of a first function of the vehicle and a second initialization of a second function of the vehicle. For instance, the system(s) may cause the first initialization of the first function 110 and the second initialization of the second function 112 during the allocation of the one or more resources 108. As described herein, the system(s) may be operating in a specific operating phase during the allocation of the resource(s) 108, such as the initialization phase 102 and/or the failsafe phase 106. Additionally, the first function 110 may include a non-safety related function and/or a failsafe function that is associated with one or more levels of safety and the second function 112 may include an availability function that is associated with one or more additional, higher levels of safety.

The method 400, at block B404, may include causing, during the allocation of the one or more resources, the first function to be available for use. For instance, the system(s) may determine that the first initialization of the first function 110 is complete. As such, the system(s) may cause the first function 110 to be available for use by the user even though the resource(s) 108 is still being allocated, such as during the initialization phase 102 and/or the failsafe phase 106. In some examples, the system(s) makes the first function 110 available in order to more quickly provide the user with access to the features of the first function 110.

The method 400, at block B406, may include causing, based at least on the allocation of the one or more resources being complete, the second function to be available for use. For instance, the system(s) may determine that the allocation of the resource(s) 108 is complete. In some examples, the system(s) may then monitor to make sure that no errors have yet occurred with the system(s) and/or any functions. In some examples, the system(s) may then switch from operating in the initialization phase 102 and/or the failsafe phase 106 to operating in the operational phase 114 and/or the availability phase 116. The system(s) may then cause the second function 112 to be available for use by the user. In some examples, the system(s) waits until the allocation of the resource(s) 108 is complete in order to avoid any interference with the operation of the second function 112.

The method 400, at block B408, may include causing, based at least on the second function, the vehicle to perform one or more operations. For instance, the system(s) may cause the vehicle to perform the operation(s) based at least on the second function 112. For a first example, if the second function 112 includes a fully autonomous function, then the system(s) may cause the vehicle to navigate based at least on outputs from the second function 112. For a second example, if the second function 112 is a minimum risk maneuver function, then the system(s) may cause the vehicle to navigate according one or more minimum risk maneuvers output by the second function 112, such as to safely stop on a side of a road. While these are just two examples of operations that may be performed by the vehicle, in other examples, the vehicle may perform additional and/or alternative operations.

Figure 5:
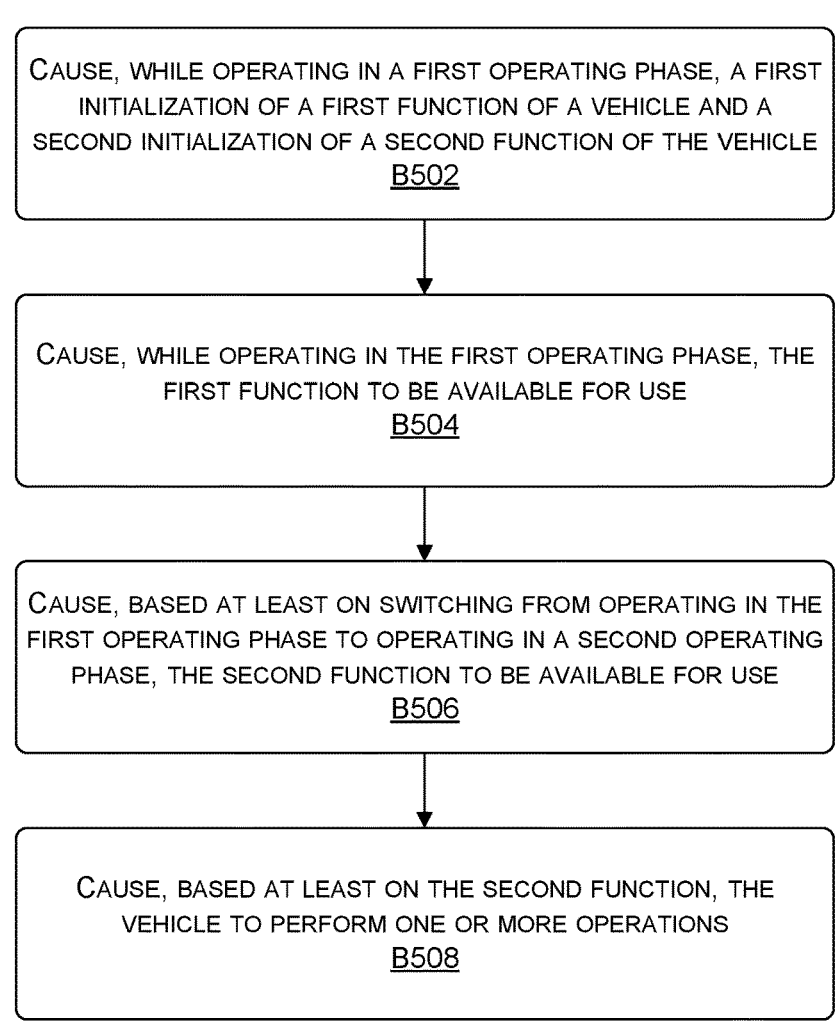
FIG. 5 illustrates a flow diagram showing a method for booting functions associated with a vehicle using various operating phases, in accordance with some embodiments of the present disclosure.

FIG. 5 illustrates a flow diagram showing a method 500 for booting functions associated with a vehicle using various operating phases, in accordance with some embodiments of the present disclosure. The method 500, at block B502, may include causing, while operating in a first operative phase, a first initialization of a first function of a vehicle and a second initialization of a second function of the vehicle. For instance, the system(s) may cause the first initialization of the first function 110 and the second initialization of the second function 112 while operating in the first operating phase. As described herein, the first operating phase associated with the system(s) may include the initialization phase 102 and/or the failsafe phase 106. Additionally, the system(s) may perform additional processes while operating in the first operating phase, such as starting the hardware of the vehicle, starting the software of the vehicle, starting the operating system of the vehicle, allocating the resources 108 of the vehicle, monitoring the system(s) for one or more errors, and/or the like.

The method 500, at block B504, may include causing, while operating in the first operating phase, the first function to be available for use. For instance, the system(s) may determine that the first initialization of the first function 110 is complete. As such, the system(s) may cause the first function 110 to be available for use by the user even while the system(s) is still operating in the first operating phase. In some examples, the system(s) makes the first function 110 available in order to more quickly provide the user with access to the features of the first function 110. Additionally, even though an error may occur with the first function 110 while operating in the first operating phase, the first function 110 may include a non-safety related function and/or a failsafe function such that the error may not compromise the safety of the vehicle and/or may minimally compromise the safety of the vehicle.

The method 500, at block B506, may include causing, based at least on switching from operating in the first operating phase to operating in a second operating phase, the second function to be available for use. For instance, the system(s) may determine that an event occurred, such as the allocation of the resources 108 being complete, the entire system(s) being ready, safety checks indicating that there are no errors with the system(s) and/or the functions, and/or so forth. Based at least on the event, the system(s) may switch from operating in the first operating phase to operating in the second operating phase, such as the operational phase 114 and/or the availability phase 116. The system(s) may then cause the second function 112 to be available for use by the user. In some examples, the system(s) waits until operating in the second operating phase in order to avoid any interference with the operation of the second function 112.

The method 500, at block B508, may include causing, based at least on the second function, the vehicle to perform one or more operations. For instance, the system(s) may cause the vehicle to perform the operation(s) based at least on the second function 112. For a first example, if the second function 112 includes a fully autonomous function, then the system(s) may cause the vehicle to navigate based at least on outputs from the second function 112. For a second example, if the second function 112 is a minimum risk maneuver function, then the system(s) may cause the vehicle to navigate according one or more minimum risk maneuvers output by the second function 112, such as to safely stop on a side of a road. While these are just two examples of operations that may be performed by the vehicle, in other examples, the vehicle may perform additional and/or alternative operations.

Figure 6:
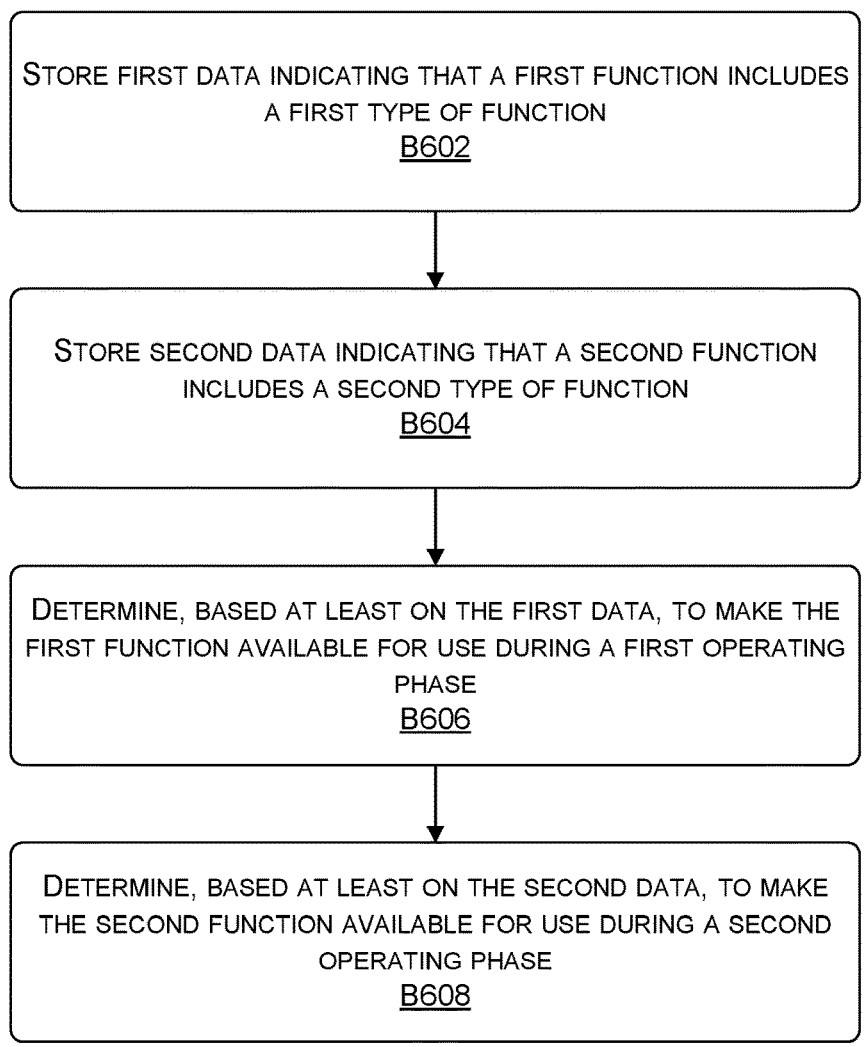
FIG. 6 illustrates a flow diagram showing a method for using configuration data to incrementally boot functions associated with a vehicle, in accordance with some embodiments of the present disclosure.

FIG. 6 illustrates a flow diagram showing a method 600 for using configuration data to incrementally boot functions associated with a vehicle, in accordance with some embodiments of the present disclosure. The method 600, at block B602, may include storing first data indicating that a first function includes a first type of function. For instance, the system(s) may store the first data indicating that the first function 110 includes the first type of function. As described herein, the first type of function may be associated with functions 110 that include one or more non-safety related functions and/or one or more failsafe functions. In some examples, the system(s) stores the first data based at least on receiving, from one or more devices, input data indicating that the first function 110 includes the first type of function.

The method 600, at block B604, may include storing second data indicating that a second function includes a second type of function. For instance, the system(s) may store the second data indicating that the second function 112 includes the second type of function. As described herein, the second type of function may be associated with functions 112 that include availability functions. In some examples, the system(s) stores the second data based at least on receiving, from the one or more devices, input data indicating that the second function 112 includes the second type of function.

The method 600, at block B606, may include determining, based at least on the first data, to make the first function available for use during a first operating phase. For instance, the system(s) may use the first data to determine to make the first function 110 available for use during the first operating phase, such as the initialization phase 102 and/or the failsafe phase 106. For example, the system(s) may make the first function 110 available based at least on an initialization of the first function 110 being complete such that the first function 110 is ready for use. As described herein, the system(s) may make the first function 110 available by starting the first function 110 and/or allowing the user to use features associated with the first function 110.

The method 600, at block B608, may include determining, based at least on the second data, to make the second function available for use during a second operating phase. For instance, the system(s) may use the second data to determine to make the second function 112 available during the second operating phase, such as the operational phase 114 and/or the availability phase 116. For example, even if an initialization of the second function 112 is complete during the first operating phase, the system(s) may still wait to make the second function 112 available for use until the second operating phase. As described herein, the system(s) may make the second function 112 available by starting the second function 112 and/or allowing the user to use features associated with the second function 112.

Figure 7:
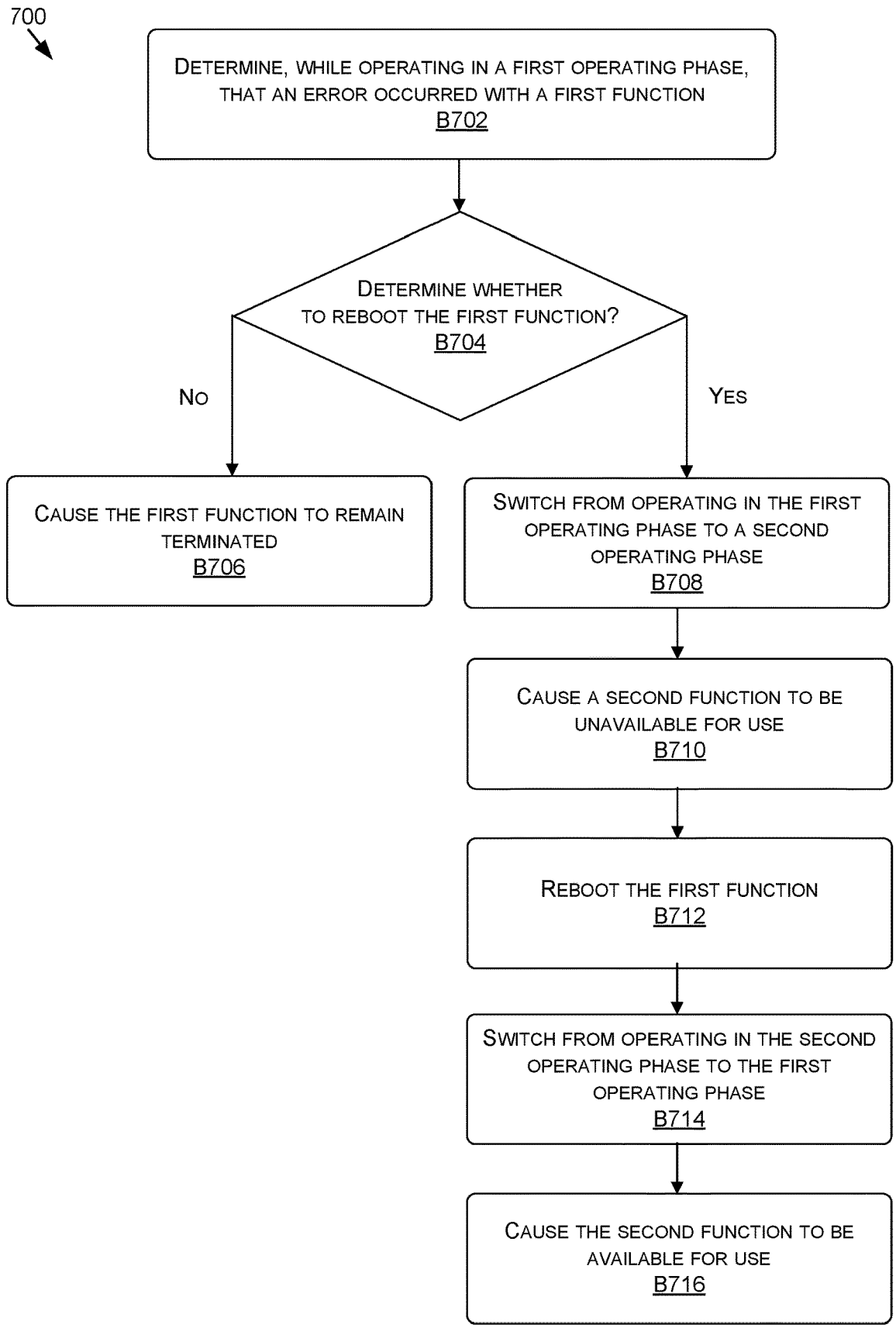
FIG. 7 illustrates a flow diagram showing a method for using various operating phases to reboot a function for which an error occurs, in accordance with some embodiments of the present disclosure.

FIG. 7 illustrates a flow diagram showing a method 700 for using various operating phases to reboot a function for which an error occurs, in accordance with some embodiments of the present disclosure. The method 700, at block B702, may include determining, while operating in a first operating phase, that an error occurred with a first function. For instance, the system(s) may be operating in the operational phase 114 and/or the availability phase 116. While operating in the operational phase 114 and/or the availability phase 116, the system(s) may determine that the error occurred with the first function, which may include a function 110 and/or a function 112 in the example of FIG. 7.

The method 700, at block B704, may include determining whether to reboot the first function. For instance, the system(s) may determine whether to reboot the first function using one or factors. The factor(s) may include, but is not limited to, whether the first function is a safety function and/or a failsafe function, whether the first function is an availability function, whether hardware needs restarted, whether software needs restarted, a current driving scenario of the vehicle, and/or any other factor. If, at block B704, it is determined not to restart the first function, then the method 700, at block B706, may include causing the first function to remain terminated. For instance, if the system(s) determines not to restart the first function, then the system(s) may cause the first function to remain terminated. The system(s) may also determine whether to terminate one or more additional functions and/or whether to continue navigating.

However, if, at block B704, it is determined to restart the first function, then the method 700, at block B708, may include switching from operating in the first operating phase to a second operating phase. For instance, if the system(s) determines to restart the first function, then the system(s) may switch to operating in the initialization phase 102 (e.g., the failsafe phase 106) and/or the reinitialization phase 118.

The method 700, at block B710, may include causing a second function to be unavailable for use and the method 700, at block B712, may include rebooting the first function. For instance, the system(s) may then cause a second function, such as a function 112, to be unavailable for use. In some examples, the system(s) may cause the second function to be unavailable in order to prevent an error with the second function when rebooting, such as from interference with the rebooting of the first function. The system(s) may then cause the first function to reboot.

The method 700, at block B714, may include switching from operating in the second operating phase to the first operating phase and the method 700, at block B716, may include causing the second function to be available for use. For instance, the system(s) may then switch back to the operational phase 114 and/or the availability phase 116. Additionally, the system(s) may again cause the second function to be available for use. In some examples, the system(s) may cause the second function to be available for use since errors may not occur with the second function, such as from interference, when operating in the operational phase 114 and/or the availability phase 116.

Example Autonomous Vehicle

Figure 8A:
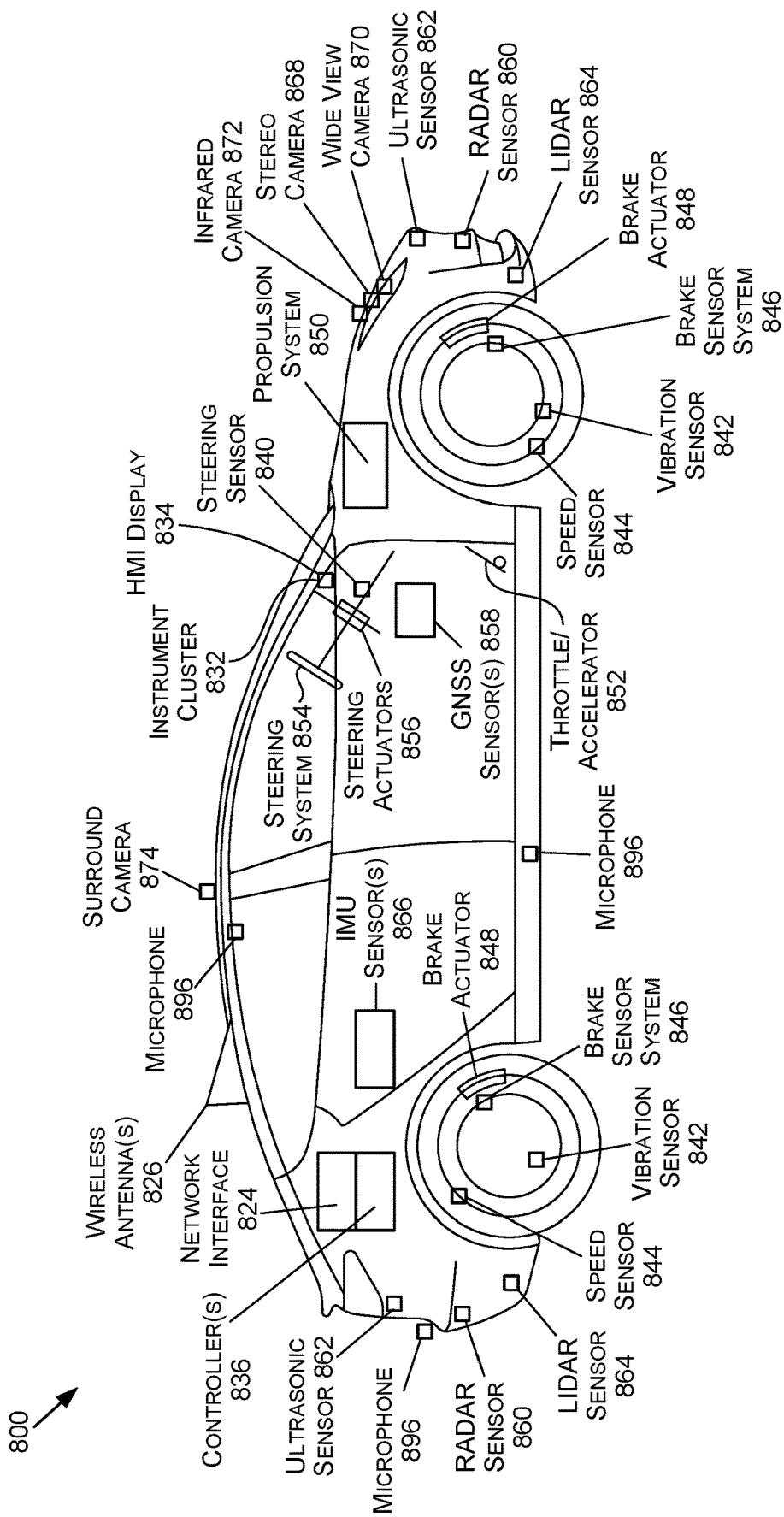
FIG. 8A is an illustration of an example autonomous vehicle, in accordance with some embodiments of the present disclosure.

FIG. 8A is an illustration of an example autonomous or semi-autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. The vehicle 800 may be capable of functionality in accordance with one or more of Level 1-Level 5 of the autonomous driving levels. For example, the vehicle 800 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 800 or other machine, such as being fully autonomous, being highly autonomous, being conditionally autonomous, being partially autonomous, providing assistive autonomy, being semi-autonomous, being primarily autonomous, or other designation.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems ("GNSS") sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the High Definition ("HD") map 822 of FIG. 8C), location data (e.g., the vehicle's 800 location, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 800 further includes a network interface 824 which may use one or more wireless antenna(s) 826 and/or modem(s) to communicate over one or more networks. For example, the network interface 824 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 826 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 8B:
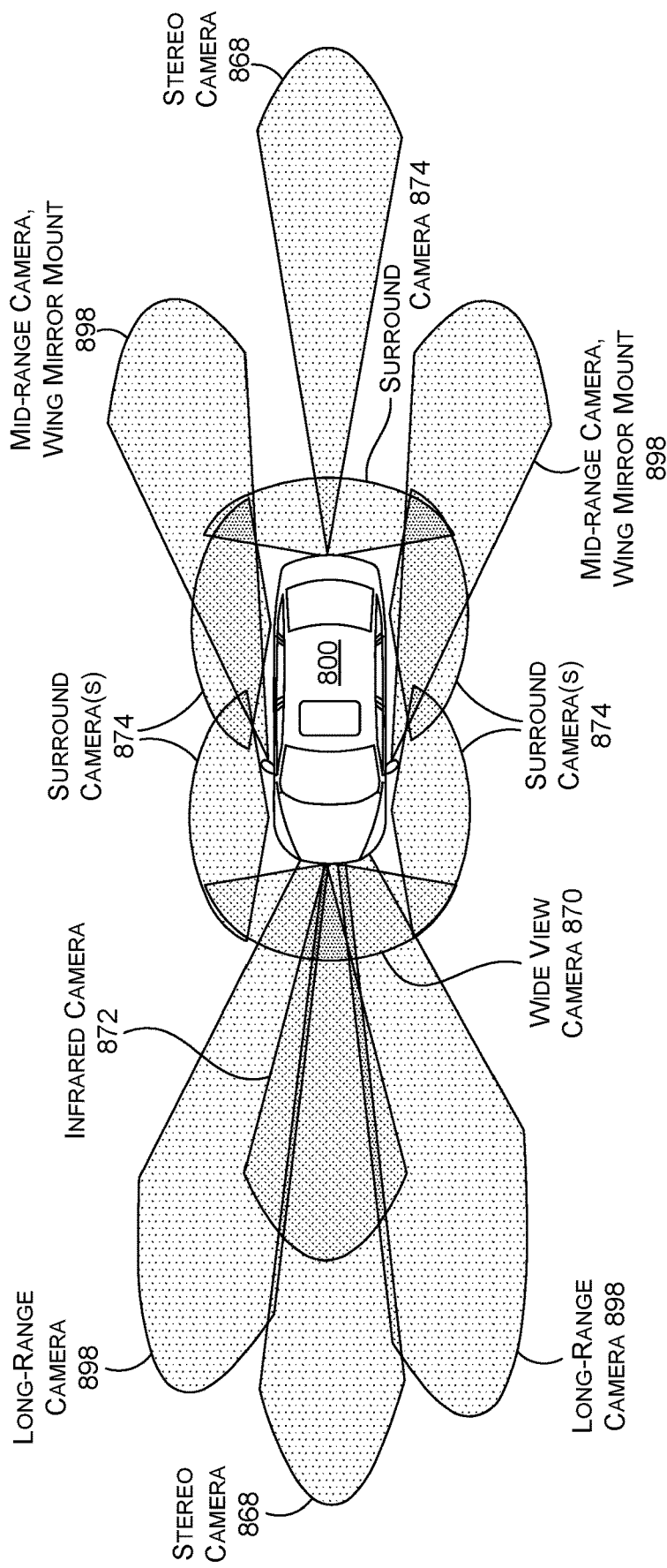
FIG. 8B is an example of camera locations and fields of view for the example autonomous vehicle of FIG. 8A, in accordance with some embodiments of the present disclosure.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 800 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may be any number (including zero) of wide-view cameras 870 on the vehicle 800. In addition, any number of long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

Any number of stereo cameras 868 may also be included in a front-facing configuration. In at least one embodiment, one or more of stereo camera(s) 868 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that include portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle 800. The surround camera(s) 874 may include wide-view camera(s) 870, fisheye camera(s), 360 degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868, infrared camera(s) 872, etc.), as described herein.

Figure 8C:
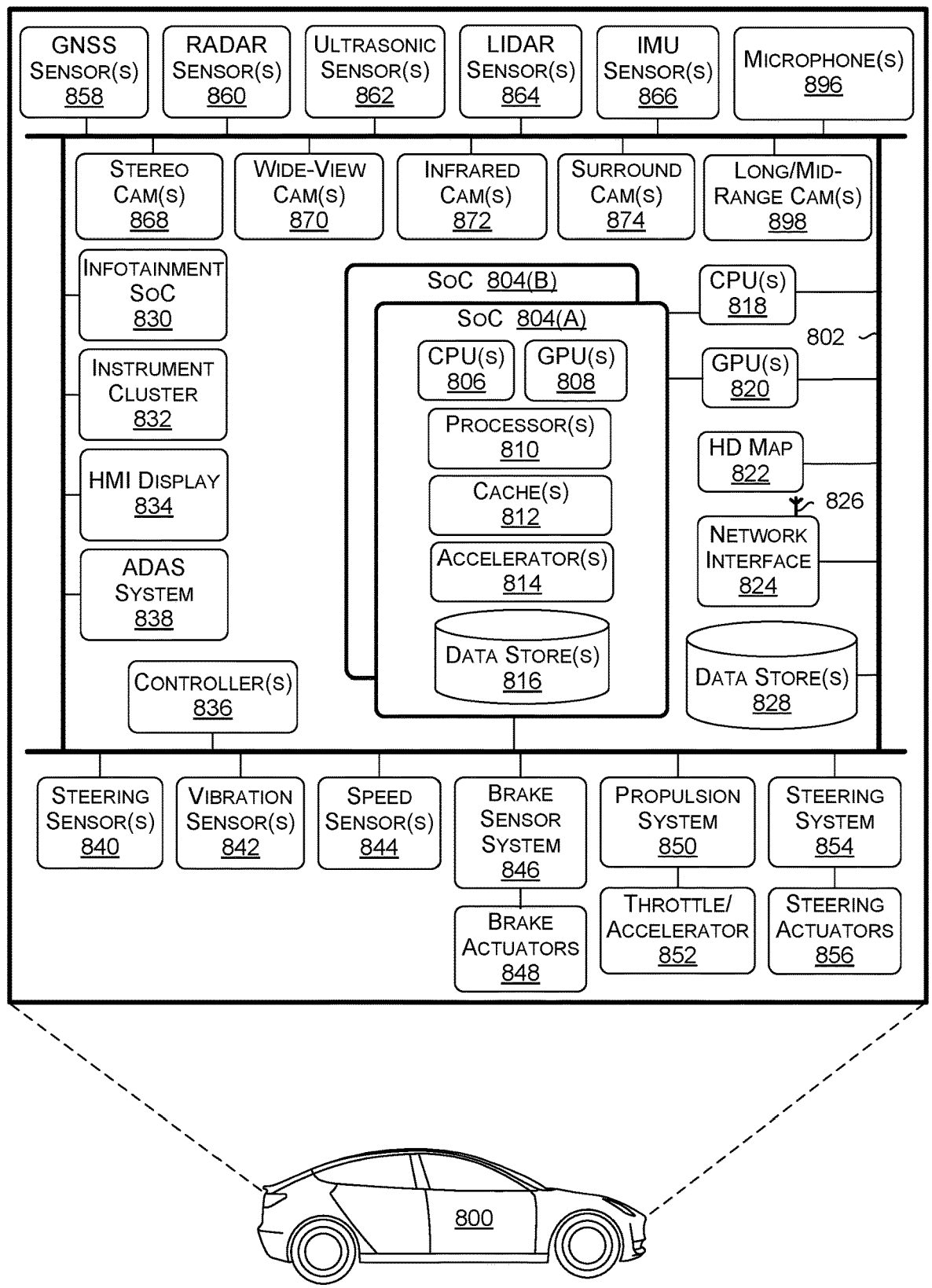
FIG. 8C is a block diagram of an example system architecture for the example autonomous vehicle of FIG. 8A, in accordance with some embodiments of the present disclosure.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C are illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800, and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 866 output that correlates with the vehicle 800 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 812 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, that use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858. The GNSS sensor(s) 858 (e.g., GPS, assisted GPS sensors, differential GPS (DGPS) sensors, etc.), to assist in mapping, perception, occupancy grid generation, and/or path planning functions. Any number of GNSS sensor(s) 858 may be used, including, for example and without limitation, a GPS using a USB connector with an Ethernet to Serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 800 surroundings at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 800 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 800 m, with an accuracy of 2 cm-3 cm, and with support for a 800 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 800. The LIDAR sensor(s) 864, in such examples, may provide up to a 120-degree horizontal and 35-degree vertical field-of-view, with a 200 m range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 800. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include a SoC, in some examples. The ADAS system 838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjust the vehicle speed to maintain a safe distance from vehicles ahead. Lateral ACC performs distance keeping, and advises the vehicle 800 to change lanes when necessary. Lateral ACC is related to other ADAS applications such as LCA and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 800), while the I2V communication concept provides information about traffic further ahead. CACC systems may include either or both I2V and V2V information sources. Given the information of the vehicles ahead of the vehicle 800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network which is trained and thus reduces the risk of false positives, as described herein.

The vehicle 800 may further include the infotainment SoC 830 (e.g., an in-vehicle infotainment system (IVI)). Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 800. For example, the infotainment SoC 830 may radios, disk players, navigation systems, video players, USB and Bluetooth connectivity, carputers, in-car entertainment, Wi-Fi, steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
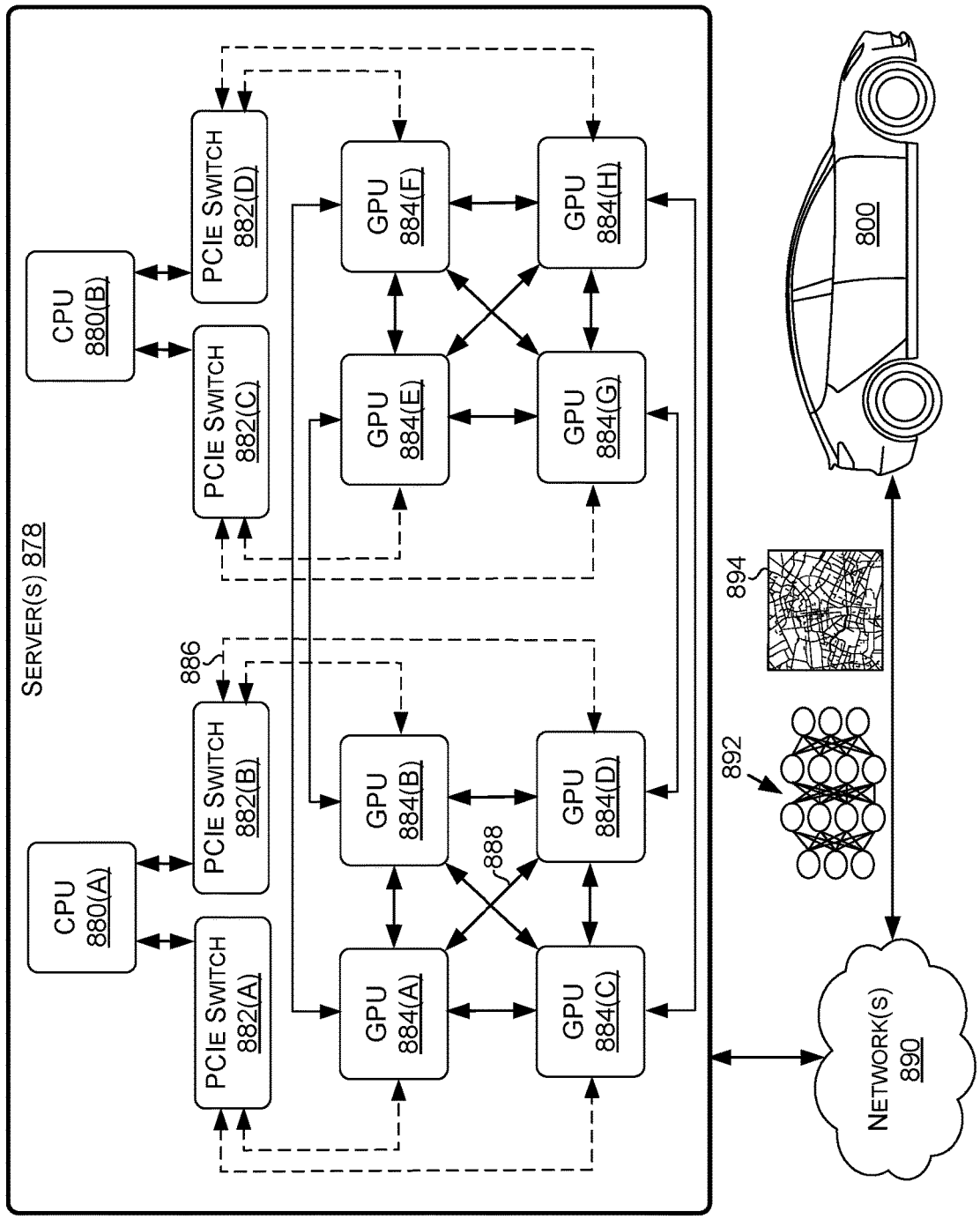
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 9:
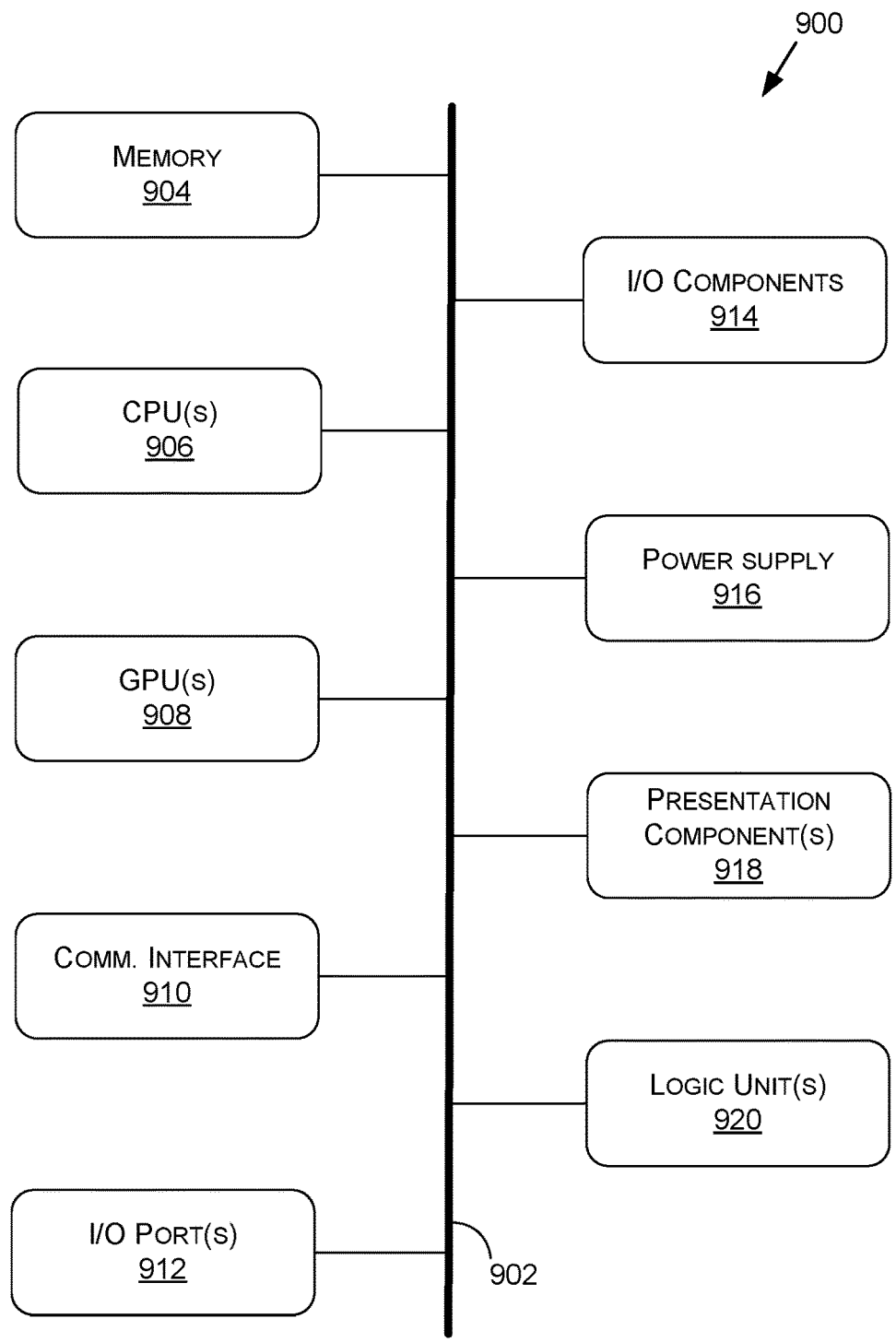
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 920 and/or communication interface 910 may include one or more data processing units (DPUs) to transmit data received over a network and/or through interconnect system 902 directly to (e.g., a memory of) one or more GPU(s) 908.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, DPUs, etc.), and output the data (e.g., as an image, video, sound, etc.).

Example Data Center

Figure 10:
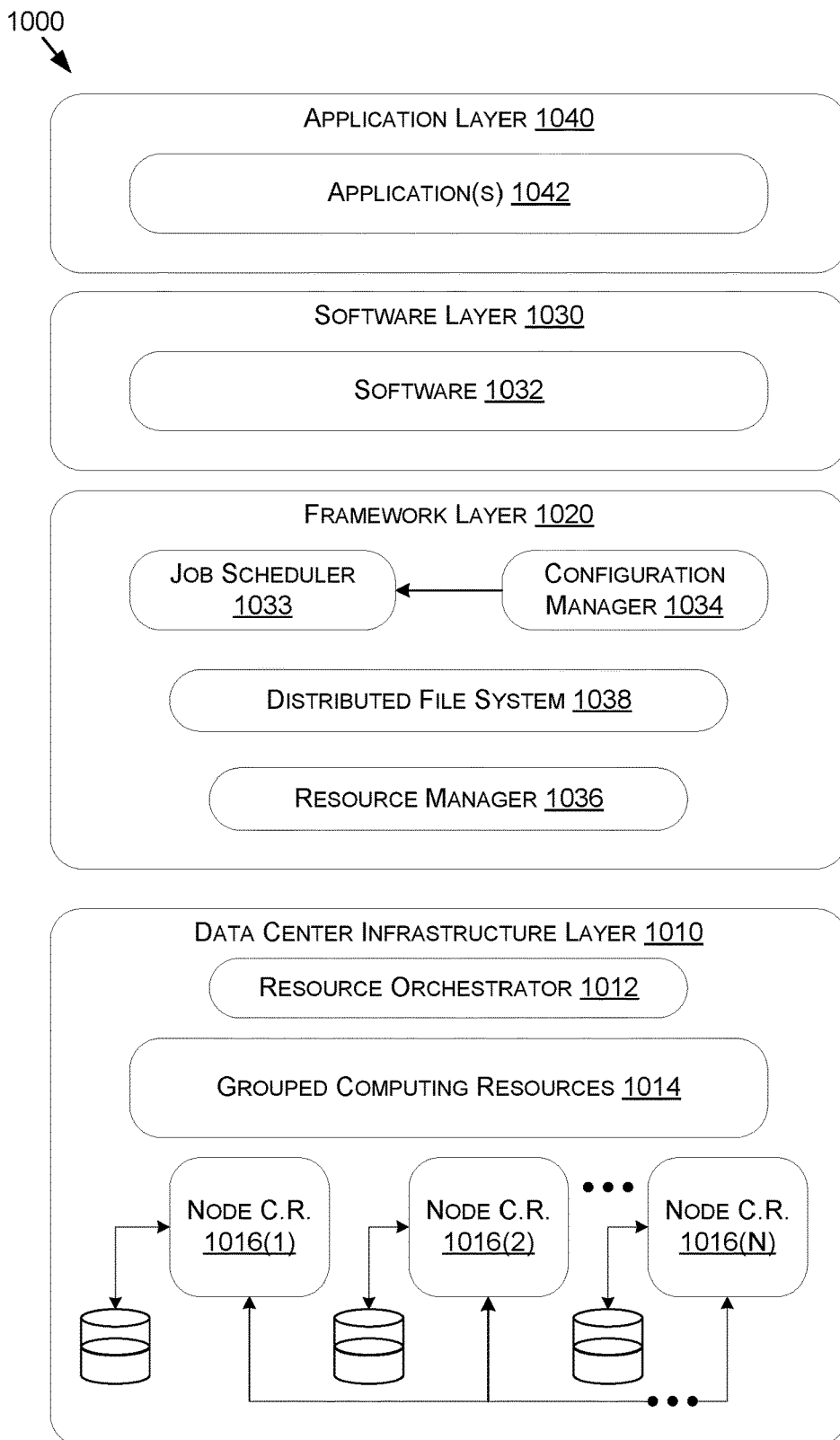
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161(N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1012 may configure or otherwise control one or more node C.R.s 1016(1)-1016(N) and/or grouped computing resources 1014. In at least one embodiment, resource orchestrator 1012 may include a software design infrastructure (SDI) management entity for the data center 1000. The resource orchestrator 1012 may include hardware, software, or some combination thereof.

In at least one embodiment, as shown in FIG. 10, framework layer 1020 may include a job scheduler 1033, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1033 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1033. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016(1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    causing, during allocation of one or more resources associated with a machine that occurs in response to the machine being initialized, a first initialization of a first function of the machine and a second initialization of a second function of the machine, the first function being associated with a first safety level and the second function being associated with a second safety level;
    causing, during the allocation of the one or more resources and after the first initialization is complete, the first function of the machine to be available for use based at least on the first function being associated with the first safety level;
    causing, during the allocation of the one or more resources and after the second initialization is complete, the second function of the machine to remain unavailable for use based at least on the second function being associated with the second safety level;
    causing, based at least on the allocation of the one or more resources being complete, the second function of the machine to then be available for use; and
    causing, based at least on the second function, the machine to perform one or more control operations for navigating the machine through at least a portion of an environment.

2. The method of claim 1, wherein:
    the first function of the machine includes a first type of function that is associated with the first safety level; and the second function of the machine includes a second type of function that is associated with the second safety level that is greater than the first safety level.

3. The method of claim 1, further comprising:

causing the machine to operate in a first operating phase based at least on the allocation of the one or more resources occurring, wherein the causing of the first function of the machine to be available for use and the causing the second function of the machine to be unavailable for use occurs while the machine is operating in the first operating phase; and causing the machine to operate in a second operating phase based at least on the allocation of the one or more resources being complete, wherein the causing of the second function of the machine to be available for use occurs while the machine is operating in the second operating phase.

4. The method of claim 3, further comprising:

causing, while the machine is operating in a third operating phase, at least one of starting a hardware associated with the machine, starting a software associated with the machine, starting an operating system associated with the machine, or starting a monitoring of the one or more resources associated with the machine, wherein the first operating phase and the third operating phase are associated with the machine being initialized.

5. The method of claim 1, further comprising:

based at least on detecting an error associated with the first function, causing the second function to no longer be available for use;

causing, while the second function is no longer available for use, a third initialization associated with the first function;

causing, while the second function is no longer available for use, the first function to again be available for use; and after the first function is again available for use, causing the second function to again be available for use.

6. The method of claim 1, further comprising:

storing first data indicating that the first function includes a first type of function, wherein the causing the first function to be available for use during the allocation of the one or more resources is further based at least on the first function including the first type of function; and storing second data indicating that the second function includes a second type of function, wherein the causing the second function to be available for use is further based at least on the second function including the second type of function.

7. The method of claim 1, further comprising:

determining that the second initialization of the second function is complete during the allocation of the one or more resources; and determining, based at least on the second function being associated with the second safety level, to wait until the allocation of the one or more resources is complete before making the second function available for use.

8. The method of claim 1, further comprising:

determining that an event associated with navigating the machine has occurred; and based at least on the event occurring, causing a first termination of the first function and a second termination of the second function.

9. A system comprising:

one or more processors configured to:

cause, during a first operating phase associated with a machine in which one or more resources of the machine are being allocated, a first initialization of a first function associated with the machine and a second initialization of a second function associated with the machine;

cause, during the first operating phase and after the first initialization is complete, the first function associated with the machine to be available for use;

cause, during the first operating phase and after the second initialization is complete, the second function associated with the machine to be unavailable for use;

cause, during a second operating phase associated with the machine in which the one or more resources are allocated, the second function associated with the machine to be available for use; and cause, based at least on the second function, the machine to perform one or more operations to navigate.

10. The system of claim 9, wherein:

the first function associated with the machine includes a first type of function that is associated with a first level of safety; and the second function associated with the machine includes a second type of function that is associated with a second level of safety that is greater than the first level of safety.

11. The system of claim 10, wherein:

the first function associated with the machine is caused to be available for use during the first operating phase based at least on the first function being associated with the first level of safety; and the second function associated with the machine is caused to be unavailable for use during the first operating phase based at least on the second function being associated with the second level of safety.

12. The system of claim 9, wherein the one or more processors are further configured to:

cause, during a third operating phase associated with the machine, at least one of starting a hardware associated with the machine, starting a software associated with the machine, starting an operating system associated with the machine, or starting a monitoring of one or more resources associated with the machine, wherein the first operating phase and the third operating phase are associated with an initialization of the machine.

13. The system of claim 9, wherein the one or more processors are further configured to:

based at least on detecting an error associated with the first function, cause the second function no longer be available;

cause, while the second function is no longer available, a third initialization associated with the first function;

cause, while the second function is no longer available, the first function to again be available for user; and after the first function is again available for use, cause the second function to again be available for use.

14. The system of claim 9, wherein the one or more processors are further configured to:

store first data indicating that the first function includes a first type of function, wherein the first function is caused to be available for use during the first operating phase based at least on the first function including the first type of function; and store second data indicating that the second function includes a second type of function, wherein the second function is caused to be unavailable for use during the first operating phase based at least on the second function including the second type of function.

15. The system of claim 9, wherein the one or more processors are further configured to:
   determine that the second initialization of the second function is complete during the first operating phase; and
   determine, based at least on a type of the second function, to wait until the second operating phase before making the second function available for use.

16. The system of claim 9, wherein the one or more processors are further configured to:
   determine that an event associated with navigating the machine has occurred; and
   based at least on the event occurring, cause, during a third operating phase associated with the machine, a first termination of the first function and a second termination of the second function.

17. The system of claim 9, wherein the system is comprised in at least one of:
   a control system for an autonomous or semi-autonomous machine;
   a perception system for an autonomous or semi-autonomous machine;
   a system for performing simulation operations;
   a system for performing digital twin operations;
   a system for performing light transport simulation;
   a system for performing collaborative content creation for 3D assets;
   a system for performing deep learning operations;
   a system implemented using an edge device;
   a system implemented using a robot;
   a system implementing one or more large language models (LLMs);
   a system for performing one or more generative AI operations;
   a system for performing conversational AI operations;
   a system for generating synthetic data;
   a system incorporating one or more virtual machines (VMs);
   a system implemented at least partially in a data center; or
   a system implemented at least partially using cloud computing resources.

18. One or more processors comprising:
   processing circuitry to:
      cause, during a first operating phase associated with a machine in which one or more resources of the machine are being allocated, a first initialization of a non-safety related function and a second initialization of an availability function;
      cause, during the first operating phase and after the first initialization of the non-safety related function is complete, the non-safety related function to be available for use;
      cause, during the first operating phase and after the second initialization of the availability function is complete, the availability function to be unavailable for use;
      cause, during a second operating phase in which the one or more resources associated with the machine are finished being allocated, the availability function to be available for use; and
      cause, based at least on the availability function, the machine to perform one or more operations to navigate.

19. The one or more processors of claim 18, wherein the processing circuitry is further to:
   store data indicating that the availability function includes a first type of function and the non-safety related function includes a second type of function, wherein the non-safety related function is caused to be available during the first operating phase based at least on the non-safety related function including the second type of function.

20. The one or more processors of claim 18, wherein the one or more processors are comprised in at least one of:
   a control system for an autonomous or semi-autonomous machine;
   a perception system for an autonomous or semi-autonomous machine;
   a system for performing simulation operations;
   a system for performing digital twin operations;
   a system for performing light transport simulation;
   a system for performing collaborative content creation for 3D assets;
   a system for performing deep learning operations;
   a system implemented using an edge device;
   a system implemented using a robot;
   a system implementing one or more large language models (LLMs);
   a system for performing one or more generative AI operations;
   a system for performing conversational AI operations;
   a system for generating synthetic data;
   a system incorporating one or more virtual machines (VMs);
   a system implemented at least partially in a data center; or
   a system implemented at least partially using cloud computing resources.

\* \* \* \* \*